(12) United States Patent
Weinstein et al.

(10) Patent No.: US 7,635,426 B2
(45) Date of Patent: Dec. 22, 2009

(54) TANGENTIAL FILTRATION HOUSING

(75) Inventors: Martin J. Weinstein, South Dartmouth, MA (US); Attila Herczeg, Southborough, MA (US)

(73) Assignee: GE Healthcare Bio-Sciences Corp., Piscataway, NJ (US)

( * ) Notice: Subject to any disclaimer, the term of this patent is extended or adjusted under 35 U.S.C. 154(b) by 389 days.

(21) Appl. No.: 10/531,786

(22) PCT Filed: Nov. 7, 2003

(86) PCT No.: PCT/US03/35555

§ 371 (c)(1),
(2), (4) Date: Apr. 18, 2005

(87) PCT Pub. No.: WO2004/043577

PCT Pub. Date: May 27, 2004

(65) Prior Publication Data

US 2006/0163141 A1   Jul. 27, 2006

Related U.S. Application Data

(60) Provisional application No. 60/425,198, filed on Nov. 8, 2002.

(51) Int. Cl.
*B01D 25/26* (2006.01)
*B01D 63/08* (2006.01)
*B01D 61/14* (2006.01)

(52) U.S. Cl. .............. 210/231; 210/224; 210/226; 210/227; 210/321.75; 210/321.84; 210/346

(58) Field of Classification Search .............. None
See application file for complete search history.

(56) References Cited

U.S. PATENT DOCUMENTS

| | | | |
|---|---|---|---|
| 4,105,560 A | 8/1978 | Fismer | |
| 4,430,218 A | 2/1984 | Perl et al. | |
| 4,715,955 A | 12/1987 | Friedman | |
| 4,849,102 A | 7/1989 | Latour et al. | |

*Primary Examiner*—Krishnan S Menon
(74) *Attorney, Agent, or Firm*—Yonggang Ji (57) ABSTRACT

A filtration housing is disclosed. The housing includes: a first plate and a second plate, where the first plate and the second plate are configured to retain a filtration cassette; the second end plate includes a feed channel that communicates with an inlet port, where the inlet port is connected to a source of fluid; the first plate includes a retenate channel that extends into an outlet port; the second plate includes a first filtrate channel and a second filtrate channel, where the first filtrate channel includes a first longitudinal portion that is parallel to the feed channel and a transverse portion that communicates with a first filtrate passage; the second filtrate channel includes a second longitudinal portion that is parallel to the retenate channel and a second transverse portion that communicates with a second filtrate passage; and the first and second transverse filtrate channel portions are configured to form acute angles with an upper surface of the first end plate, where the source of fluid is configured to flow out of an outlet port of the first end plate.

7 Claims, 6 Drawing Sheets

TANGENTIAL FILTRATION HOUSING

CROSS REFERENCE TO RELATED APPLICATIONS

The present application is a filing under 35 U.S.C. § 371 and claims priority to international patent application number PCT/US2003/035555 filed Nov. 7, 2003, published on May 27, 2004 as WO 2004/043577 and also claims priority to U.S. provisional patent application No. 60/425,198 filed Nov. 8, 2002. The entire disclosure of which is incorporated herein by reference.

FIELD OF THE INVENTION

The present invention relates generally to filtration apparatus and, more particularly, to a housing apparatus for accommodating an exchangeable filtration cassette.

BACKGROUND OF THE INVENTION

Microfiltration and ultrafiltration equipment is required for many applications including the concentration; fractionation and ultrapurification of protein solutions; the depyrogenation of water and intravenous solutions; the desalting of biologicals; and the removal of macromolecules and colloids. A well-known type of such apparatus employs a filtration cassette comprising a stacked array of ultrafiltration membranes separated by flow accommodating screens and retained between demountable plates. Some of the problems associated with such equipment stem from the requirements for frequent cleaning and replacement of filtration cassettes. One ultrafiltration unit, for example, utilizes fluid flow parts in each of the demountable plates thereby necessitating dismantling of an entire system for each cleaning or filtration cassette replacement procedure. Other ultrafiltration units require specially designed filtration cassettes and are not compatible for use with commonly available filtration cassettes. One such unit is disclosed in U.S. Pat. No. 4,430,218. Another unit is disclosed in U.S. Pat. No. 4,715,955, which includes a housing having internal flow passages. The flow passages, however, are oriented to be perpendicular or parallel to the transverse edges of the housing which thereby provides horizontally-oriented surfaces on which leftover filtrate or feed/retentate fluid may collect from use of the housing. These horizontal surfaces therefore provide the potential for contamination when the housing is used in successive filtration operations.

There is therefore a need for a tangential filtration housing which reduces the risk of contamination of successive uses of the housing.

SUMMARY OF THE INVENTION

In view of the needs of the art, the present invention provides a filtration housing for a filter cassette includes a base frame means supporting a first and second parallel upstanding plate to be movable thereon relative to each other in directions normal thereto. The filter cassette includes feed fluid passages in fluid communication with retentate fluid passages and in obstructed fluid communication through filter membranes with a number of filtrate passages. The cassette provides ports for the feed, retentate, and filtrate ports along opposed first and second edges thereof. The filtration cassette being retained between opposing first major surfaces of the parallel plates with the direction of movement thereof aligned with the axis of the membrane sheets.

The first plate defines a first channel substantially parallel to and axially aligned with first edges of the cassette, a second channel substantially parallel to and axially aligned with the second edges of the cassette, and a third channel means including a first portion acutely oriented with respect to either of the first and second edges of the cassette and a second portion optionally substantially transversely oriented with respect to the first and second edges of the cassette or acutely oriented thereto and extending a distance therebetween.

The filtration cassette includes an axially stacked plurality of filter membrane sheets with the filtration cassette defining a stack of fluid flow chambers having multi-edged perimeters and disposed on opposite sides of and substantially coextensive with each membrane sheet. The perimeters of the membrane sheets and the chambers are sealed such that fluid flow between adjacent chambers must pass through a membrane sheet straddled thereby. Also defined by the filtration cassette are a plurality of feed passages communicating with alternating ones of the chambers adjacent first axially aligned edges thereof, a plurality of retentate passages communicating with the alternating chambers adjacent to second axially aligned edges thereof opposite to the first edges, and a plurality of filtrate passage means communicating with other ones of the chambers between the alternating ones thereof and with the filtrate passage means entering the other chambers adjacent to either the first or second aligned edges.

Included in the apparatus are a base frame and a pair of parallel plates supported by the frame and movable thereon relative to each other in directions normal thereto. The filtration cassette is retained between the parallel plates with the direction of movement thereof aligned with the axis of the membrane sheets and one of the plates defines a first channel substantially parallel to and axially aligned with the first edges, a second channel substantially parallel to and axially aligned with the second edges, and a third channel means including one portion acutely oriented to either of the first and second edges and another portion being optionally substantially parallel or acutely oriented thereto and extending a distance therebetween.

Providing three channels in a one of a pair of end plates provides an apparatus which can be easily dismantled for cleaning or filtration cassette replacement and reduces the potential for providing horizontal surfaces on which fluid may collect and remain between uses of the housing.

According to certain features of the invention, the first channel is a feed channel communicating with the feed passages, the second channel is a retentate channel communicating with the retentate passages of the filter cassette, and the third channel means is a filtrate channel means communicating with the filtrate passage means of the filter cassette, and the transverse another channel portion is oriented acutely with respect to a surface of the one plate facing the filtration cassette and one of the first and second edges of the filter cassette. The acutely angled feed channel portions establish a specifically desirable structural arrangement providing an operator with easy access to the fittings associated with each of the channels and ensuring confidence that any fluid within the housing will drain out through the fittings.

According to other features of the invention, the filtrate channel means comprises a first filtrate channel including one portion acutely oriented to the first edges and another portion acutely oriented to thereto, and a second filtrate channel including one portion acutely oriented to the second edges and another portion acutely oriented thereto; and the filtrate passage means comprises first filtrate passage means entering the chambers adjacent to the first edges, and second filtrate passage means entering the chambers adjacent to the second edges. The use of first and second filtrate passages and channels increases the throughput of the apparatus. Moreover, forming both portions of the filtrate channels acutely oriented with respect to the first and second edges of the filter cassette further ensures that there will be no horizontal surfaces internal to the housing on which fluid may collect after use. The present invention contemplates that the first and second filtrate channels may optionally communicate with either a single filtrate outlet port or with respective first and second filtrate outlet ports.

In one embodiment of the invention, the opposite ends of the feed channel terminate, respectively, at one side wall of the one plate and the filtration cassette facing surface thereof, opposite ends of the retentate channel terminate, respectively, at the one side wall and the facing surface thereof, and opposite ends of each filtrate channel terminate, respectively, at the one side wall and the facing surface thereof. This embodiment is useful when fluid connections to only a single side wall of a single end plate are desirable.

According to further features of the invention, filtration housing accommodates a filtration cassette having its feed passages, retentate passages, and filtrate passage means extending axially through the filtration cassette and in rectalinear alignment along the first and second edges. This arrangement provides a structurally desirable geometry for the housing.

BRIEF DESCRIPTION OF THE DRAWINGS

These and other objects and features of the invention will become more apparent upon a perusal of the following description taken in conjunction with the accompanying drawings wherein.

DETAILED DESCRIPTION OF THE PREFERRED EMBODIMENTS

Figure 1:
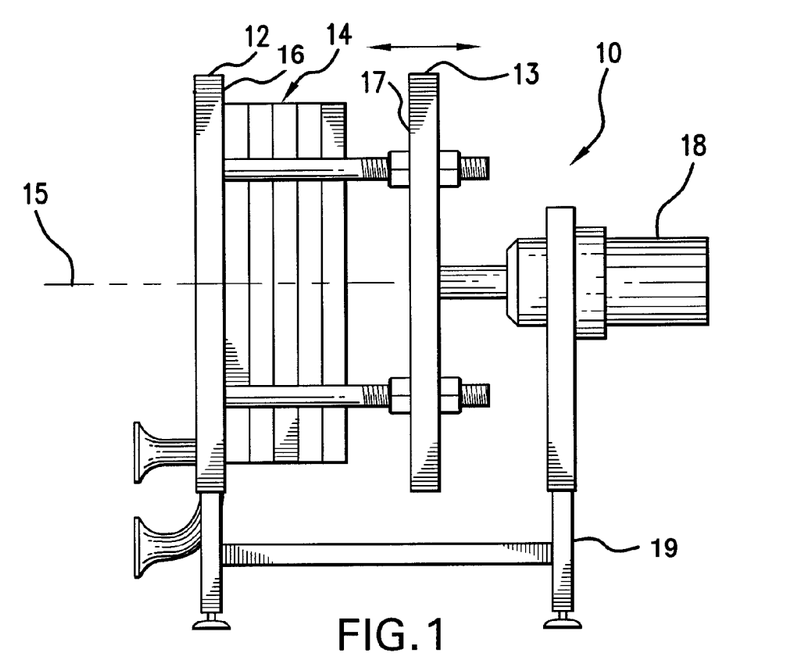
FIG. 1 is a schematic elevational view of a filtration device according to the invention.
Figure 2:
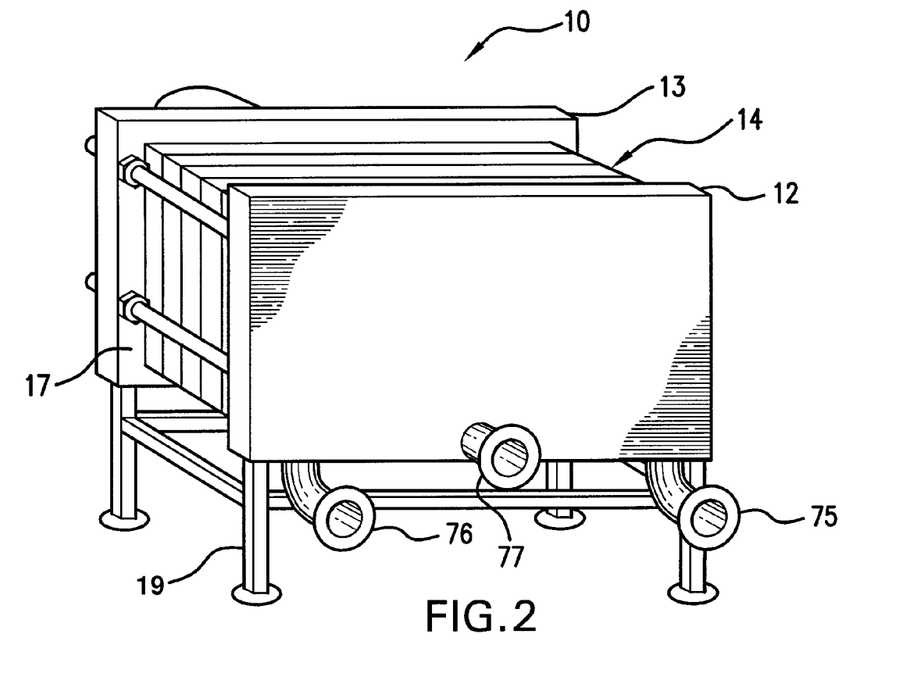
FIG. 2 is a schematic cross-sectional view taken along lines 2-2 of FIG. 1.
Figure 3:
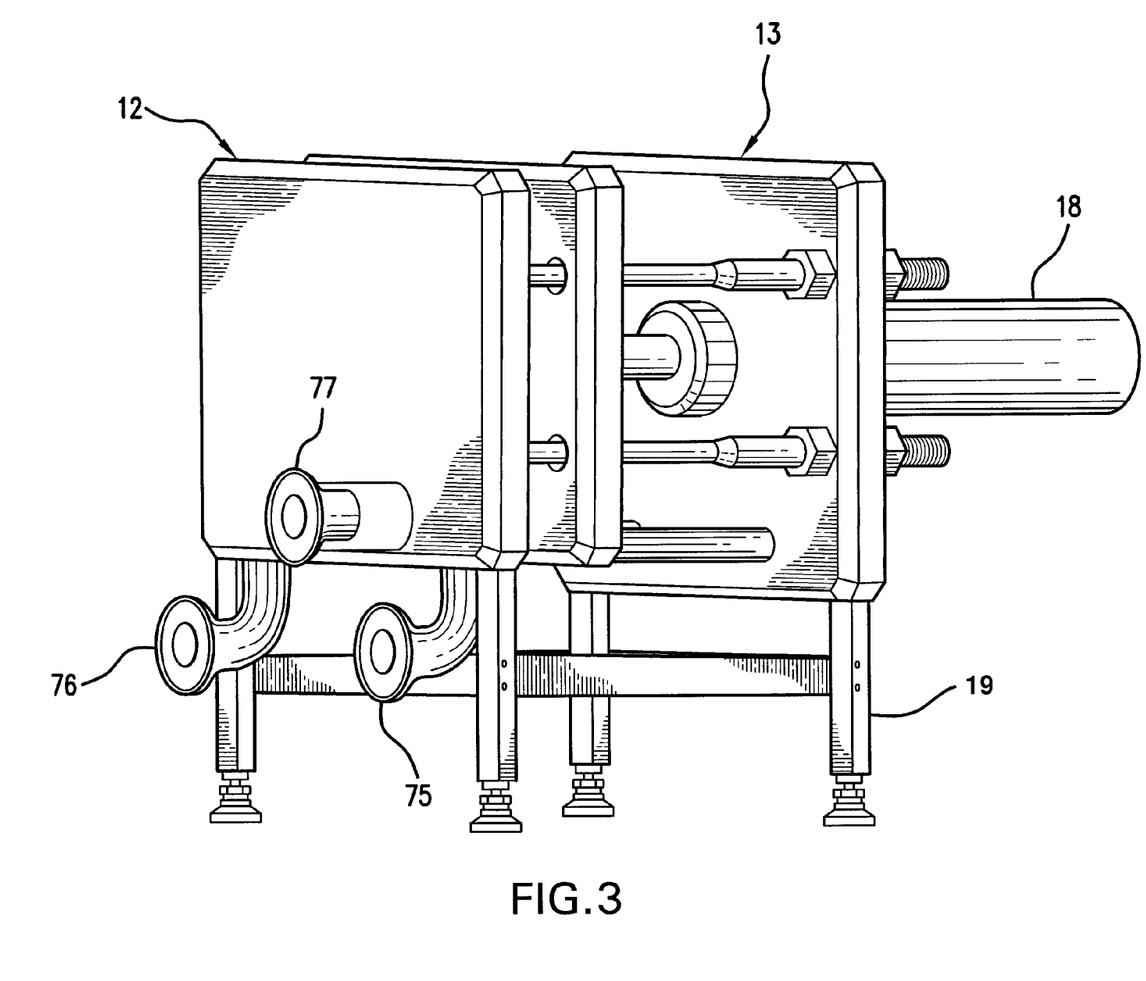
FIG. 3 is a schematic cross-sectional view taken along lines 3-3 of FIG. 1.

Referring to FIG. 1, the present invention provides a filtration housing (10) including a first and second upstanding parallel mounting end plates (12) and (13) providing major planar surfaces (16) and (17) in facing opposition. Plates (12) and (13) straddle and retain an ultra filtration cassette (14) composed of a plurality of perimeterally aligned, square-shaped components arranged in a longitudinal stacking axis (15). Supporting plates (12) and (13) are a base frame (19) that permits relative movement therebetween along the longitudinal axis (15) of the filtration cassette (14). A pneumatic piston (18) or a nut (18) is affixed to base frame (19) for urging plate (13) towards and away from plate (12) for the removable fluid-tight retention of filtration cassette therebetween. FIGS. 2 and 3 are equivalent to FIG. 1, but FIGS. 2 and 3 also include outlet ports (75), (76) and (77) in an opposite end wall.

Figure 4:
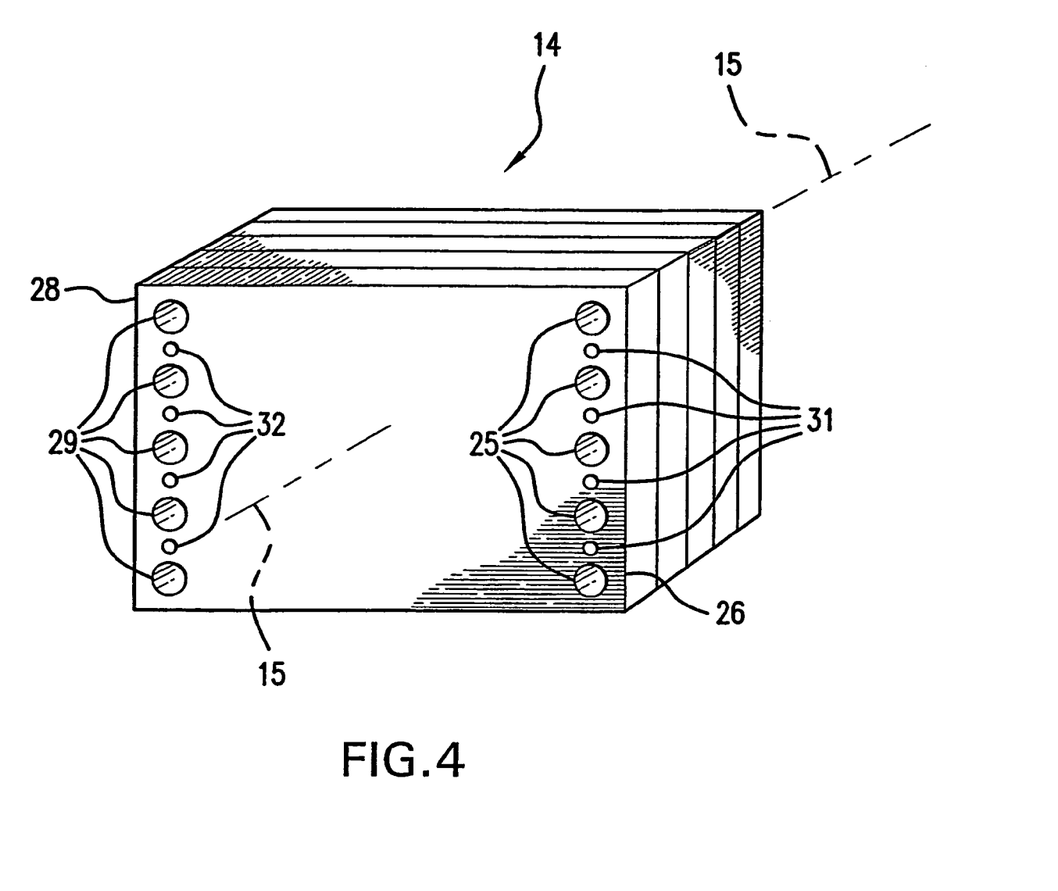
FIG. 4 is a schematic cross-sectional view taken along lines 4-4 of FIG. 2.
Figure 5:
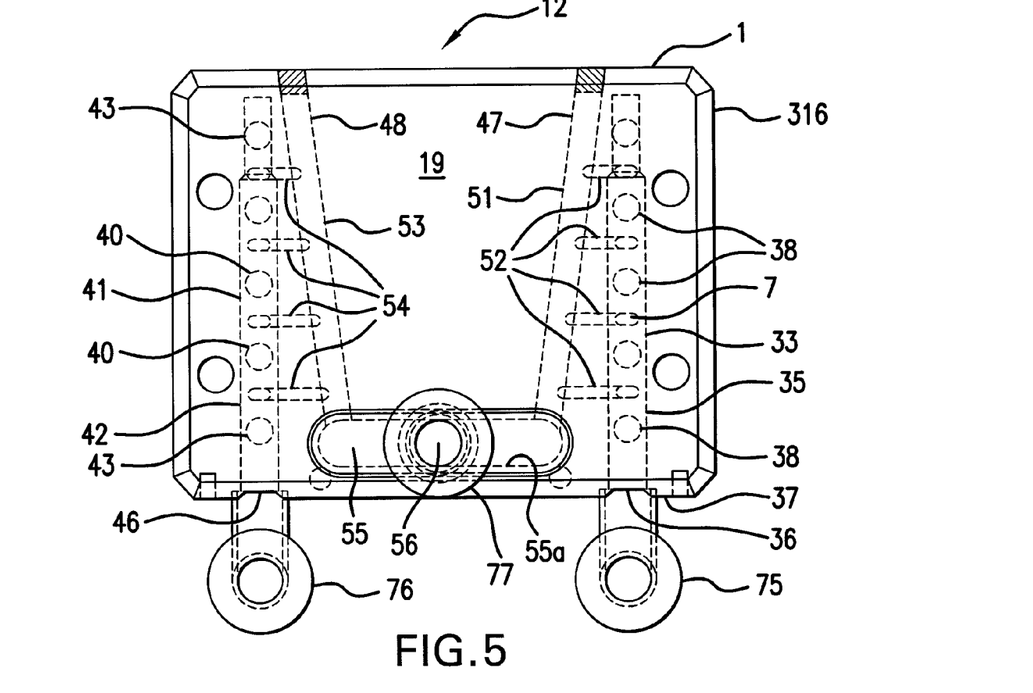
FIG. 5 is an exploded partial view of the device shown in FIGS. 1-4.

As shown in FIGS. 4 and 5, the filtration cassette (14) includes axially directed retentate passage (29). A first axially directed filtrate passage (31) extends through the first edges (26) thereof and between and parallel to the feed passages (25, 26). Similarly formed adjacent to the opposite edges (26) is a second axially directed filtrate passage (32) parallel to and between the retentate passage (29).

Referring to FIGS. 3, 4 and 5, formed in the end plate (13) is an elongate feed channel (33) having a longitudinal feed passage portion (35) extending parallel to the edges (26) and communicating with an inlet port (36) in a sidewall (37). The feed passage portion (35) is in fluid communication with feed portions (38, 39) that terminate with openings in an end wall (37) of the plate (13) facing the filtration cassette (14). Communicating with the portions (38, 39) of the feed channel (33), respectively, are the feed passages (25, 26). In the end plate (12) there is a retentate channel (41) shown most clearly in FIG. 5. The retentate channel (41) includes a longitudinal portion (42) extending parallel to the longitudinal portion (35) of the feed channel (33) and upwardly directed portions (40, 43) that communicate, respectively, with the retentate passage (29). An outer end of the retentate channel portion (42) terminates with an outlet port (46) in the side wall (37) of the end plate (12). Additionally formed in the end plate (13) are a first filtrate channel (47) and a second filtrate channel (48) shown in FIG. 5. The first filtrate channel (47) includes a first longitudinal portion (51) that is parallel and adjacent to the feed channel (33), and a first transverse filtrate channel portion (52) that extends between the edges (26) and (28) and communicates with the first filtrate passage (31). Similarly formed is a second filtrate channel (48) having a longitudinal portion (53) that is parallel and adjacent to the retentate channel (41) and a second transverse filtrate channel portion (54) that extends between the edges (26) and (28) and communicates with the second filtrate passage (32). The transverse filtrate channel portions (52, 54) form acute angles with an upper surface (55) of the end plate (12) where the surface (55) has an inner portion (55a). Outer ends of the longitudinal filtrate channel portions (51, 53) terminate, respectively, with outlet ports (75, 76, 77) in the sidewall (37) of the end plate (13).

A fluid flow path exists between the feed passages (25, 26) and adjacent one edge (26) of the filtration cassette (14) and the retentate passage (29) adjacent the opposite edge (28).

Operation

Referring to FIGS. 1 and 5, during use of the housing (10), the nuts (18) are loosened to permit separation of the end plates (12, 13) and insertion of a predetermined ultrafiltration filtration cassette (14) therebetween. The nuts (18) then are tightened to securely seal the filtration cassette (14) between the end plates (12) and (13). Suitable fluid handling tubing and couplings (not shown) are employed to connect the inlet port (36) to a source of pressurized fluid to be filtered, and the outlet port (46) to a collection vessel for a retentate resulting from the filter process, and the outlet ports (75, 76, 77) to a collection vessel for a filtrate produced by the filtration process. Pressurized fluid introduced through the inlet port (36) flow through the longitudinal and transverse portions (37, 38, 39) of the feed channel (33), the feed passages (25, 26). The filtrate entering the filtrate passage (31) flows through the transverse and parallel portions (52, 51) of the filtrate channel (47) and exits through a hole (56) of the outlet port (77). Similarly, the filtrate entering the filtrate passage (32) passes through the transverse and longitudinal portions (54, 53) of the filtrate channel (48) and exits through the hole (56) of the outlet port (77).

It should be noted that the apparatus depicted in FIGS. 1 through 5 is merely exemplary and that various dimensions have been exaggerated for purposes of illustrative clarity. For the same reasons, the number of feed, retentate and filtrate passages (25, 26, 31, 32 29) have been limited as shown in FIGS. 1 through 5 while in most cases their number would be substantially increased.

Figure 6:
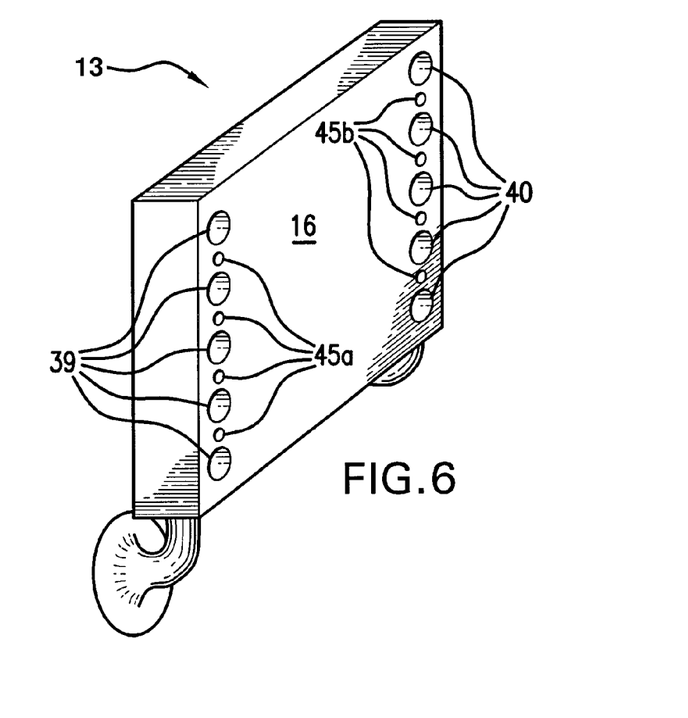
FIG. 6 is a schematic perspective view of a modified mounting plate embodiment of the invention.

Referring to FIG. 6 formed in the end plate (12) are the feed passages (40, 45b) that communicate, respectively, with the retentate passage (39) and the filtration passage (45a) as shown on the front part (16) of the end plate (12).

Figure 7:
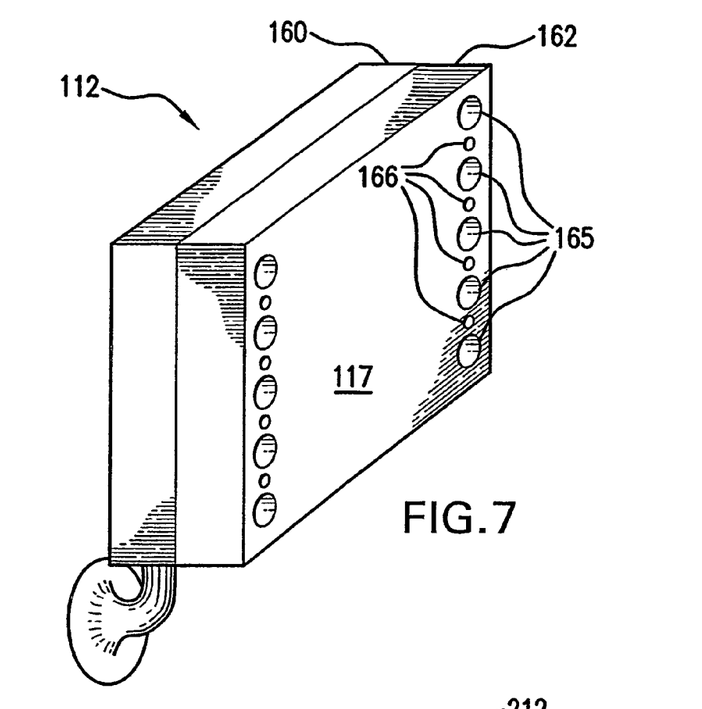
FIG. 7 is a schematic perspective view of another modified mounting plate embodiment of the invention.

FIG. 7 in the end plate (112) are the feed passages (166, 165) as shown on the front part (117) of the end plate (112), which have edges (160, 162).

Figure 8:
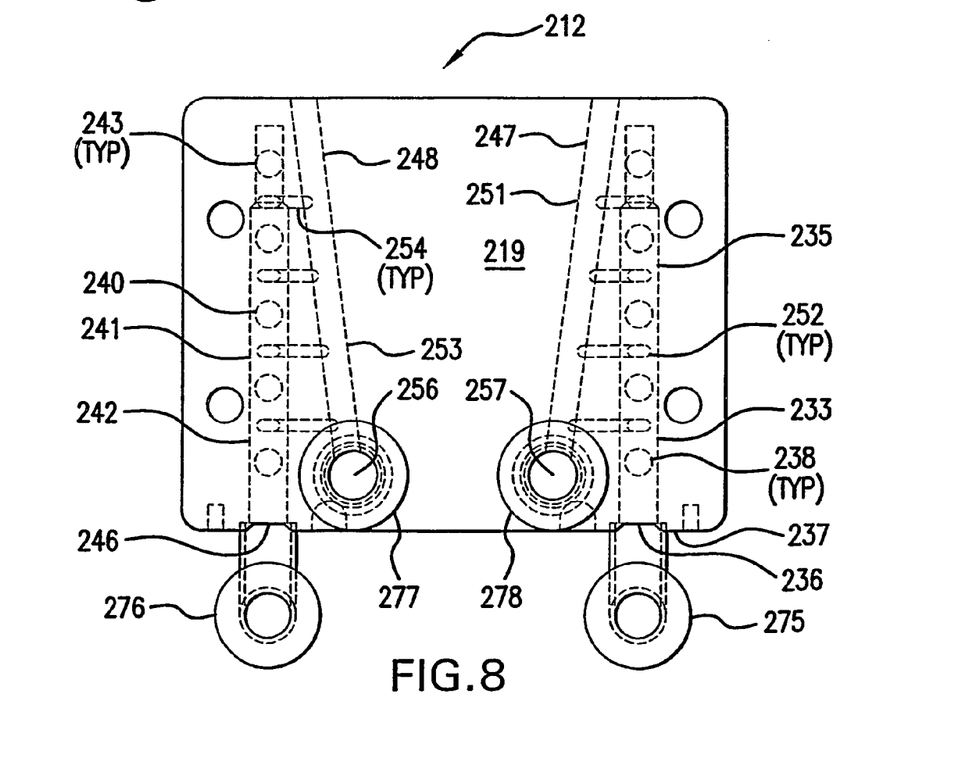
FIG. 8 is a schematic perspective view of the reverse surface of the device of FIG. 5.

Referring to FIGS. 4 and 8, formed in the end plate (212) is an elongate feed channel (233) having a longitudinal feed passage portion (235) extending to the edges (26) and communicating with an inlet port (236) in a sidewall (237). The feed passage portion (235) is in fluid communication with feed portion (238, 39) that terminate with openings in an end wall (237) of the plate (212) facing the filtration cassette (14). Communicating with the portions (238, 39) of the feed channel (233), respectively, are the feed passages (25, 26). Also formed in the end plate (212), is a retentate channel (241). The retentate channel (241) includes a longitudinal portion (242) extending parallel to the longitudinal portion (235) of the feed channel (233) and upwardly directed portions (240, 243) that communicate, respectively, with the retentate passage (29). An outer end of the retentate channel portion (242) terminates with an outlet port (246) in the side wall (237) of the end plate (212). Additionally formed in the end plate (212) are a first filtrate channel (247) and a second filtrate channel (248). The first filtrate channel (247) includes a first longitudinal portion (251) that is parallel and adjacent to the feed channel (233), and a transverse portion (252) that extends between the edges (26) and (28) and communicates with the filtrate passage (31). Similarly formed is a second filtrate channel (248) having a longitudinal portion (253) that is parallel and adjacent to the retentate channel (241) and a transverse portion (254) that extends between the edges (26) and (28) and communicates with the filtrate passage (31). The transverse filtrate channel portions (252, 254) form acute angles with an upper surface (255) of the first end plate (212). Outer ends of the longitudinal filtrate channel portions (251, 253) terminate, respectively, with outlet ports (277, 278) in the sidewall (237) of the end plate (212). Fluid may be drained out of the plate (212) through a first hole (256) in the first outlet port (277) and a second hole (257) in the second outlet port (278).

Figure 9:
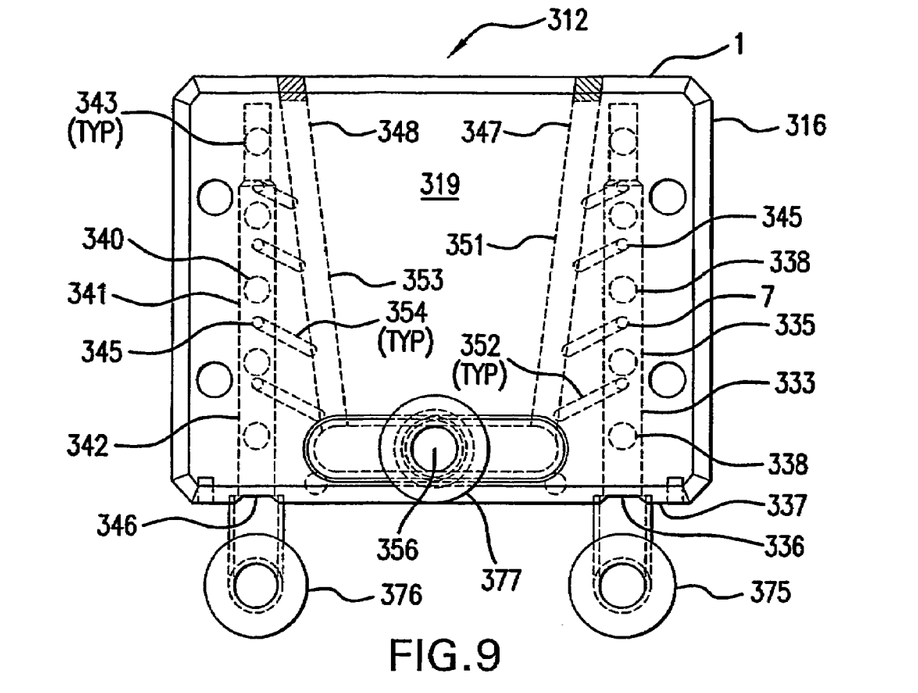
FIG. 9 is a schematic perspective view of a preferred embodiment of a filtration device of this invention.

Referring to FIGS. 4 and 9, formed in the end plate (312) is an elongate feed channel (333) having a longitudinal feed passage portion (335) extending parallel to the edges (26) and communicating with an inlet port (336) in a sidewall (337). The feed passage portion (335) is in fluid communication with feed portions (338, 39) that terminate with openings in the sidewall (337) of the plate (312) facing the filtration cassette (14). Communicating with the portions (338, 39) of the feed channel (333), respectively, are the feed passages (25, 26). Also formed in the end plate (312), is a retentate channel (341). The retentate channel (341) includes a longitudinal portion (342) extending parallel to the longitudinal portion (335) of the feed channel (333) and upwardly directed portions (340, 343) that communicate, respectively, with the retentate passages (29). An outer end of the retentate channel portion (342) terminates with an outlet port (346) in the side wall (337) of the end plate (312). Additionally formed in the end plate (312) is a first filtrate channel (347) and a second filtrate channel (348). The first filtrate channel (347) includes a longitudinal portion (351) that is parallel and adjacent to the feed (333), and a transverse portion (352) on a declining acute angle that extends between the edges (26) and (28) and communicates with the filtrate passage (31). Similarly formed is a second filtrate channel (348) having a longitudinal portion (353) that is parallel and adjacent to the retentate channel (341) and a transverse portion (354) on a declining acute angle that extends between the edges (26) and (28) and communicates with the filtrate passage (31). The transverse filtrate channel portions (352, 354) from acute angles with an upper surface (355) of the end plate (313). Outer ends of the longitudinal filtrate channel portions (351, 353) terminate, with outlet port (377) in the sidewall (337) of the end plate (312). Fluid may be drained out through a hole (356) of the outlet port (377).

Figure 10:
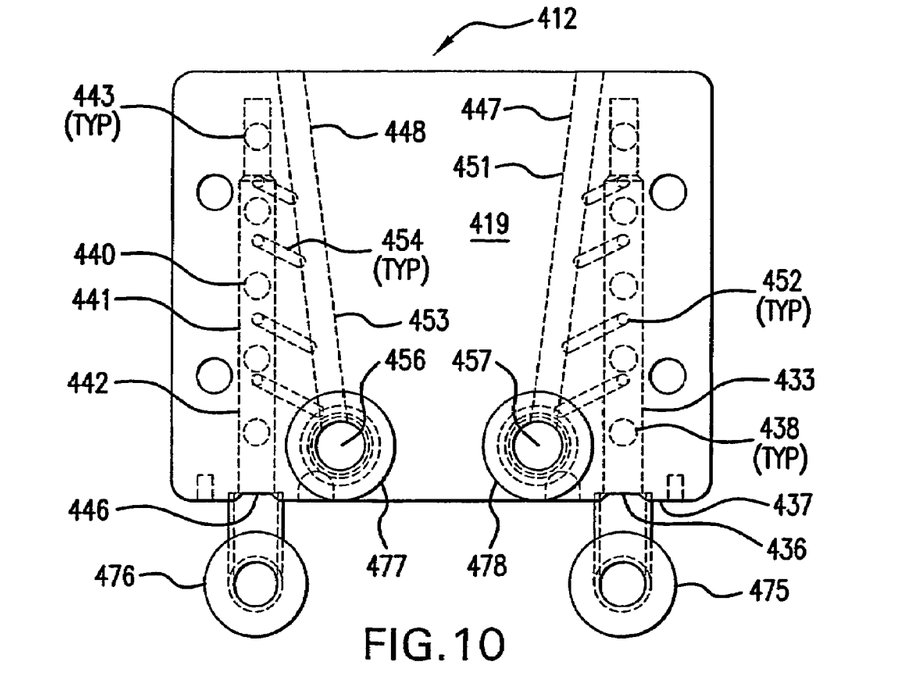
FIG. 10 is a schematic perspective view of the reverse surface of FIG. 9.

Referring to FIG. 10, formed in the end plate (412) is an elongate feed channel (433) having a longitudinal feed passage portion (435) extending parallel to the edges (26) and communicating with an inlet port (436) in a sidewall (437). The feed passage portion (435) is in fluid communication with feed portions (438, 39) that terminate with openings in an end wall (437) of the plate (412) facing the filtration cassette (14). Communicating with the portions (438, 39) of the feed channel (433), respectively, are the feed passages (not shown). Also formed in the end plate (413), is a retentate channel (441). The retentate channel (441) includes a longitudinal portion (442) extending parallel to the longitudinal portion (435) of the feed channel (433) and upwardly directed portions (440, 443) that communicate, respectively, with the retentate passages (29, 30). An outer end of the retentate channel portion (442) terminates with an outlet port (446) in the side wall (437) of the end plate (412). Additionally formed in the end plate (412) are a first filtrate channel (447) and a second filtrate channel (448). The first filtrate channel (447) includes a longitudinal portion (451) that is parallel and adjacent to the feed (433), and a transverse portion (452) on a declining acute angle that extends between the edges (26) and (28) and communicates with the filtrate passage (31). Similarly formed is a second filtrate channel (448) having a longitudinal portion (453) that is parallel and adjacent to the retentate channel (441) and a transverse portion (454) on a declining acute angle that extends between the edges (26) and (28) and communicates with the filtrate passage (432). The transverse filtrate channel portions (452, 454) from acute angles with an upper surface (455) of the end plate (413). Outer ends of the longitudinal filtrate channel portions (451, 453) terminate, respectively, with outlet ports (477, 478) in the sidewall (437) of the end plate (412). Fluid may be drained out through a hole (456) of the outlet port (477) and a hole of the outlet port (478).

Obviously, many modifications and variations of the present invention are possible in light of the above teachings. It is to be understood, therefore, that the invention can be practiced otherwise than as specifically described. The above mentioned embodiments are intended to illustrate the present invention and are not intended to limit the scope of protection claimed by the following claims.

What is claimed is:
1. A filtration housing comprising:
an upstanding end plate configured to retain a filtration cassette;

the end plate includes a feed channel that communicates with an inlet port, wherein the inlet port is connected to a filtrate;

the end plate includes a retenate channel that extends into an outlet port;

the end plate includes a first filtrate channel and a second filtrate channel;

wherein the first filtrate channel includes a first longitudinal portion that is parallel to the feed channel and a first transverse portion on a first declining acute angle that communicates with a first filtrate passage;

the second filtrate channel includes a second longitudinal portion that is parallel to the retenate channel and a second transverse portion on a second declining acute angle that communicates with a second filtrate passage; and the first and second transverse filtrate channel portions are configured to form acute angles that come together to provide a structural arrangement with an upper surface of the end plate, wherein the filtrate is configured to flow out of a single outlet port of the end plate.

2. The filtration housing of claim 1, further comprising a base frame that is configured to permit relative movement of the first plate and the end plate along a longitudinal axis of the filtration cassette.

3. The filtration housing of claim 2, further comprising a pneumatic piston affixed to the base frame to move the second plate towards and away from the end plate.

4. The filtration housing of claim 1, wherein the filtration cassette includes retenate passages.

5. The filtration housing of claim 1, wherein the filtrate is pressurized fluid.

6. A filtration housing comprising:

an upstanding end plate configured to retain a filtration cassette;

the end plate includes a feed channel that communicates with an inlet port, wherein the inlet port is connected to a filtrate;

the end plate includes a retenate channel that extends into an outlet port;

the end plate includes a first filtrate channel and a second filtrate channel;

wherein the first filtrate channel includes a first longitudinal portion that is parallel to the feed channel and a first transverse portion on a first declining acute angle that communicates with a first filtrate passage;

the second filtrate channel includes a second longitudinal portion that is parallel to the retenate channel and a second transverse portion on a second declining acute angle that communicates with a second filtrate passage; and the first and second transverse filtrate channel portions are configured to form declining acute angles that come together to provide a structural arrangement with an upper surface of the end plate, wherein the filtrate is configured to flow out a single outlet port of the end plate.

7. The filtration housing of claim 6, wherein the filtrate flows out of a hole of the single outlet port.

* * * * *